(12) United States Patent
Nonaka et al.

(10) Patent No.: US 8,896,714 B2
(45) Date of Patent: Nov. 25, 2014

(54) IMAGE PICKUP APPARATUS AND IMAGE SHAKE CORRECTION METHOD

(75) Inventors: Hirotaka Nonaka, Kanagwa-ken (JP); Hidehiro Katoh, Tokyo-to (JP); Teppei Kubota, Kanagawa-ken (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 204 days.

(21) Appl. No.: 13/522,447

(22) PCT Filed: Sep. 17, 2010

(86) PCT No.: PCT/JP2010/066231
§ 371 (c)(1),
(2), (4) Date: Jul. 16, 2012

(87) PCT Pub. No.: WO2011/086728
PCT Pub. Date: Jul. 21, 2011

(65) Prior Publication Data
US 2012/0293672 A1 Nov. 22, 2012

(30) Foreign Application Priority Data
Jan. 18, 2010 (JP) .................................. 2010-008167

(51) Int. Cl.
*H04N 5/228* (2006.01)
*H04N 5/232* (2006.01)
*G03B 5/00* (2006.01)

(52) U.S. Cl.
CPC ...... *H04N 5/23248* (2013.01); *G03B 2217/005* (2013.01); *H04N 5/23296* (2013.01); *G03B 5/00* (2013.01); *G03B 2205/0046* (2013.01); *H04N 5/23258* (2013.01); *H04N 5/23267* (2013.01); *G03B 2207/005* (2013.01); *H04N 5/23283* (2013.01); *G03B 2205/003* (2013.01)
USPC ..................................................... 348/208.5

(58) Field of Classification Search
USPC ....................................................... 348/208.5
See application file for complete search history.

(56) References Cited

U.S. PATENT DOCUMENTS

| 5,982,421 | A | * | 11/1999 | Inou et al. | 348/208.5 |
| 7,385,632 | B2 | * | 6/2008 | Shinohara et al. | 348/208.5 |
| 8,279,290 | B2 | * | 10/2012 | Yamanaka | 348/208.5 |
| 2007/0291114 | A1 | * | 12/2007 | Oshima | 348/126 |

FOREIGN PATENT DOCUMENTS

| JP | 05-014801 A | 1/1993 |
| JP | 07-123317 A | 5/1995 |
| JP | 07-177418 A | 7/1995 |
| JP | 09-046575 A | 2/1997 |
| JP | 10-056592 A | 2/1998 |
| JP | 11-015035 A | 1/1999 |
| JP | 2001-197357 A | 7/2001 |
| JP | 2002-182260 A | 6/2002 |

* cited by examiner

*Primary Examiner* — James Hannett
(74) *Attorney, Agent, or Firm* — Nath, Goldberg & Meyer; Jerald L. Meyer; Stanley N. Protigal

(57) ABSTRACT

A system controller sets an optical correction ratio, which is a distribution ratio in which a shake angle detected by a gyro sensor is distributed to optical shake correction, in accordance with an optical zoom magnification and controls a prism driver to correct the shake angle multiplied by the optical correction ratio by the optical shake correction, and also controls a read controller to correct the rest of the angle by electronic shake correction.

3 Claims, 3 Drawing Sheets

IMAGE PICKUP APPARATUS AND IMAGE SHAKE CORRECTION METHOD

TECHNICAL FIELD

The present invention relates to an image pickup apparatus that picks up an image of a subject and an image shake correction method used by the same.

BACKGROUND ART

There have been known optical shake correction and electronic shake correction as a method for correcting an image shake resulting from a hand shake in image pickup apparatuses using image pickup elements, such as a CCD (Charge Coupled Device) and CMOS (Complementary Metal Oxide Semiconductor). The optical shake correction is a method for optically correcting a shake of a photographed image by changing the optical axis angle of light incident on the image pickup element and the electronic shake correction is a method for electronically correcting a shake of a photographed image by controlling a cut-out position of the photographed image stored in a memory.

Both the optical shake correction and the electronic shake correction have a finite correctable range due to the configuration thereof. If the correctable range is extended for the optical shake correction, an increase in size of the device configuration will result. By the electronic shake correction, it is not possible to correct an image shake within an exposure time of the image pickup element, and thus the image quality tends to degrade compared to the optical shake correction.

Therefore, Patent Document 1 discloses an image pickup apparatus that extends the correctable range of an image shake by using both the optical shake correction and the electronic shake correction.

In this image pickup apparatus, an image shake is corrected effectively by increasing the ratio of correction by the electronic shake correction than that by the optical shake correction when the electronic zoom increases and by increasing the ratio of correction by the optical shake correction than that by the electronic shake correction when the electronic zoom decreases.

PRIOR ART DOCUMENTS

Patent Documents

Patent Document 1: Japanese Patent Application Laid-Open No. 2002-182260

DISCLOSURE OF THE INVENTION

Problems to be Solved

As described above, the image quality tends to degrade by the electronic shake correction compared to the optical shake correction. Further, the higher the magnification of zoom, the larger the image shake becomes. In Patent Document 1, the ratio of the electronic shake correction is increased as the magnification of zoom becomes higher, and therefore the image quality degrades.

The present invention has been made in view of the above-mentioned circumstances and has an object to provide an image pickup apparatus capable of extending the correctable range of an image shake while suppressing degradation in image quality and an image shake correction method used by the same.

Solutions to the Problems

According to an aspect of the present invention, the is provided an image pickup apparatus comprising an image pickup element configured to generate an electric signal by photoelectrically converting incident light that enters the image pickup apparatus from a subject; a signal processor configured to generate a photographed image based on the electric signal; a shake detector configured to detect a shake angle of the image pickup apparatus; an optical zoom unit configured to optically change a magnification of the photographed image; an optical shake corrector configured to optically correct a shake of the photographed image; an electronic shake collector configured to correct the shake of the photographed image by cutting out a predetermined region of the photographed image; a setting unit configured to set a ratio in which the shake angle is distributed to the optical shake corrector and the electronic shake collector, respectively, so that the higher an optical zoom magnification in the optical zoom unit, the higher a ratio is in which the shake angle is distributed to the optical shake collector, and a controller configured to distribute the shake angle based on the set ratio and to control the optical shake collector and the electronic shake corrector to collect the shake of the photographed image based on the distributed shake angles, wherein when the optical zoom magnification is at its minimum, the setting unit sets a ratio in which the shake angle is distributed so that a ratio between a shake angle to be distributed to the optical shake corrector and a shake angle to be distributed to the electronic shake corrector and a ratio between the size of correctable range of the optical shake corrector and the size of collectable range of the electronic shake collector are equal.

According to another aspect of the present invention, there is provided an image pickup apparatus comprising an image pickup element configured to generate an electric signal by photoelectrically converting incident light that enters the image pickup apparatus from a subject; a signal processor configured to generate a photographed image based on the electric signal; a shake detector configured to detect a shake angle of the image pickup apparatus; an optical shake corrector configured to optically correct a shake of the photographed image; an electronic shake connector configured to connect the shake by cutting out a predetermined region of the photographed image; a setting unit configured to set a ratio in which the shake angle is distributed to the optical shake corrector and the electronic shake corrector, respectively, so that the shorter an exposure time of the image pickup element when photoelectrically converting the incident light, the lower a ratio is in which the shake angle is distributed to the optical shake connector, and a controller configured to distribute the shake angle based on the set ratio and to control the optical shake connector and the electronic shake connector to connect the shake of the photographed image based on the distributed shake angles, wherein when the exposure time is set to the shortest exposure time in the image pickup apparatus, the setting unit sets a ratio in which the shake angle is distributed so that a ratio between a shake angle to be distributed to the optical shake connector and a shake angle to be distributed to the electronic shake connector and a ratio between the size of correctable range of the optical shake corrector and the size of correctable range of the electronic shake corrector are equal.

According to another aspect of the present invention, there is provided an image pickup apparatus comprising an image pickup element configured to generate an electric signal by photoelectrically converting incident light that enters the image pickup apparatus from a subject; a signal processor configured to generate a photographed image based on the electric signal; a shake detector configured to detect a shake angle of the image pickup apparatus; an optical zoom unit configured to optically change a magnification of the photographed image; an optical shake corrector configured to optically correct a shake of the photographed image; an electronic shake connector configured to connect the shake by cutting out a predetermined region of the photographed image; a setting unit configured to set a ratio in which the shake angle is distributed to the optical shake connector and the electronic shake corrector, respectively, based on a first ratio that becomes higher as an optical zoom magnification in the optical zoom unit becomes higher and a second ratio that becomes lower as an exposure time of the image pickup element when photoelectrically converting the incident light becomes shorter; and a controller configured to distribute the shake angle based on the set ratio and to control the optical shake corrector and the electronic shake corrector to correct the shake of the photographed image based on the distributed shake angles, wherein when the optical zoom magnification is at its minimum, the setting unit sets the first ratio so that a ratio between a shake angle to be distributed to the optical shake connector and a shake angle to be distributed to the electronic shake connector and a ratio between the size of correctable range of the optical shake corrector and the size of correctable range of the electronic shake corrector are equal.

According to another aspect of the present invention, there is provided an image pickup apparatus comprising an image pickup element configured to generate an electric signal by photoelectrically converting incident light that enters the image pickup apparatus from a subject; a signal processor configured to generate a photographed image based on the electric signal; a shake detector configured to detect a shake angle of the image pickup apparatus; an optical zoom unit configured to optically change a magnification of the photographed image; an optical shake corrector configured to optically correct a shake of the photographed image; an electronic shake connector configured to connect the shake by cutting out a predetermined region of the photographed image; a setting unit configured to set a ratio in which the shake angle is distributed to the optical shake connector and the electronic shake corrector, respectively, based on a first ratio that becomes higher as an optical zoom magnification in the optical zoom unit becomes higher and a second ratio that becomes lower as an exposure time of the image pickup element when photoelectrically converting the incident light becomes shorter, and a controller configured to distribute the shake angle based on the set ratio and to control the optical shake corrector and the electronic shake corrector to correct the shake of the photographed image based on the distributed shake angles, wherein when the exposure time is set to the shortest exposure time in the image pickup apparatus, the setting unit sets the second ratio so that a ratio between a shake angle to be distributed to the optical shake corrector and a shake angle to be distributed to the electronic shake connector and a ratio between the size of correctable range of the optical shake corrector and the size of correctable range of the electronic shake connector are equal.

According to another aspect of the present invention, there is provided an image pickup apparatus comprising an image pickup element configured to generate an electric signal by photoelectrically converting incident light that enters the image pickup apparatus from a subject; a signal processor configured to generate a photographed image based on the electric signal; a shake detector configured to detect a shake angle of the image pickup apparatus; an optical zoom unit configured to optically change a magnification of the photographed image; an optical shake corrector configured to optically correct a shake of the photographed image; an electronic shake collector configured to connect the shake by cutting out a predetermined region of the photographed image; a setting unit configured to set a ratio in which the shake angle is distributed to the optical shake collector and the electronic shake collector, respectively, based on a value of the product of a first ratio that becomes higher as an optical zoom magnification in the optical zoom unit becomes higher and a second ratio that becomes lower as an exposure time of the image pickup element when photoelectrically converting the incident light becomes shorter, and a controller configured to distribute the shake angle based on the set ratio and to control the optical shake collector and the electronic shake collector to correct the shake of the photographed image based on the distributed shake angles.

According to another aspect of the present invention, there is provided an image shake correction method for correcting a shake of an image picked up by an image pickup apparatus using an optical shake collector configured to optically collect a photographed image and an electronic shake corrector configured to correct the photographed image by cutting out a predetermined region thereof. The method comprises the steps of generating an electric signal by photoelectrically converting incident light that enters the image pickup apparatus from a subject; generating a photographed image based on the electric signal; detecting a shake angle of the image pickup apparatus; setting a ratio in which the shake angle is distributed to the optical shake collector and the electronic shake collector, respectively, so that the higher an optical zoom magnification in the optical zoom unit of the image pickup apparatus, the higher a ratio is in which the shake angle is distributed to the optical shake collector, and distributing the shake angle based on the set ratio and controlling the optical shake collector and the electronic shake collector to collect the shake of the photographed image based on the distributed shake angles, wherein in the step of setting a ratio, when the optical zoom magnification is at its minimum, a ratio in which the shake angle is distributed is set so that a ratio between a shake angle to be distributed to the optical shake collector and a shake angle to be distributed to the electronic shake corrector and a ratio of the size of collectable range of the optical shake collector and the size of collectable range of the electronic shake corrector are equal.

According to another aspect of the present invention, there is provided an image shake collection method for correcting a shake of an image picked up by an image pickup apparatus using an optical shake collector configured to optically collect a photographed image and an electronic shake collector configured to correct the photographed image by cutting out a predetermined region thereof. The method comprises the steps of generating an electric signal by photoelectrically converting incident light that enters the image pickup apparatus from a subject; generating a photographed image based on the electric signal; detecting a shake angle of the image pickup apparatus; setting a ratio in which the shake angle is distributed to the optical shake collector and the electronic shake corrector, respectively, so that the shorter an exposure time of an image pickup element of the image pickup apparatus when photoelectrically converting the incident light, the lower a ratio is in which the shake angle is distributed to the optical shake collector, and distributing the shake angle based on the set ratio and controlling the optical shake collector and the electronic shake collector to collect the shake of the photographed image based on the distributed shake angles, wherein in the step of setting a ratio, when the exposure time is set to the shortest exposure time in the image pickup apparatus, a ratio in which the shake angle is distributed is set so that a ratio between a shake angle to be distributed to the optical shake collector and a shake angle to be distributed to the electronic shake collector and a ratio between the size of correctable range of the optical shake corrector and the size of correctable range of the electronic shake corrector are equal.

According to another aspect of the present invention, there is provided an image shake collection method for correcting a shake of an image picked up by an image pickup apparatus using an optical shake collector configured to optically collect a photographed image and an electronic shake collector configured to correct the photographed image by cutting out a predetermined legion thereof. The method comprises the steps of generating an electric signal by photoelectrically converting incident light that enters the image pickup apparatus from a subject; generating a photographed image based on the electric signal; detecting a shake angle of the image pickup apparatus; setting a ratio in which the shake angle is distributed to the optical shake corrector and the electronic shake collector, respectively, based on a first ratio that becomes higher as an optical zoom magnification in the optical zoom unit of the image pickup apparatus becomes higher and a second ratio that becomes lower as an exposure time of an image pickup element of the image pickup apparatus when photoelectrically converting the incident light becomes shorter, and distributing the shake angle based on the set ratio and controlling the optical shake corrector and the electronic shake corrector to correct the shake of the photographed image based on the distributed shake angles, wherein in the step of setting a ratio, when the optical zoom magnification is at its minimum, the first ratio is set so that a ratio between a shake angle to be distributed to the optical shake collector and a shake angle to be distributed to the electronic shake collector and a ratio between the size of connectable range of the optical shake collector and the size of correctable range of the electronic shake corrector are equal.

According to another aspect of the present invention, there is provided an image shake collection method for collecting a shake of an image picked up by an image pickup apparatus using an optical shake corrector configured to optically correct a photographed image and an electronic shake collector configured to correct the photographed image by cutting out a predetermined legion thereof. The method comprises the steps of generating an electric signal by photoelectrically converting incident light that enters the image pickup apparatus from a subject; generating a photographed image based on the electric signal; detecting a shake angle of the image pickup apparatus; setting a ratio in which the shake angle is distributed to the optical shake corrector and the electronic shake collector, respectively, based on a first ratio that becomes higher as an optical zoom magnification in the optical zoom unit of the image pickup apparatus becomes higher and a second ratio that becomes lower as an exposure time of an image pickup element of the image pickup apparatus when photoelectrically converting the incident light becomes shorter, and distributing the shake angle based on the set ratio and controlling the optical shake corrector and the electronic shake corrector to correct the shake of the photographed image based on the distributed shake angles, wherein in the step of setting a ratio, when the exposure time is set to the shortest exposure time of the image pickup apparatus, the second ratio is set so that a ratio between a shake angle to be distributed to the optical shake corrector and a shake angle to be distributed to the electronic shake corrector and a ratio between the size of correctable range of the optical shake corrector and the size of collectable range of the electronic shake corrector are equal.

According to another aspect of the present invention, there is provided an image shake correction method for correcting a shake of an image picked up by an image pickup apparatus using an optical shake corrector configured to optically correct a photographed image and an electronic shake corrector configured to correct the photographed image by cutting out a predetermined region thereof. The method comprises the steps of generating an electric signal by photoelectrically converting incident light that enters the image pickup apparatus from a subject; generating a photographed image based on the electric signal; detecting a shake angle of the image pickup apparatus; setting a ratio in which the shake angle is distributed to the optical shake collector and the electronic shake collector, respectively, based on a value of the product of a first ratio that becomes higher as an optical zoom magnification in an optical zoom unit of the image pickup apparatus becomes higher and a second ratio that becomes lower as an exposure time of an image pickup element of the image pickup apparatus when photoelectrically converting the incident light becomes shorter, and distributing the shake angle based on the set ratio and controlling the optical shake collector and the electronic shake collector to correct the shake of the photographed image based on the distributed shake angles.

Effects of the Invention

According to the present invention, it is possible to extend the correctable range of an image shake while suppressing degradation in image quality.

EMBODIMENTS OF THE INVENTION

Some embodiments of the present invention will be described hereinafter with reference to the drawings.

First Embodiment

Figure 1:
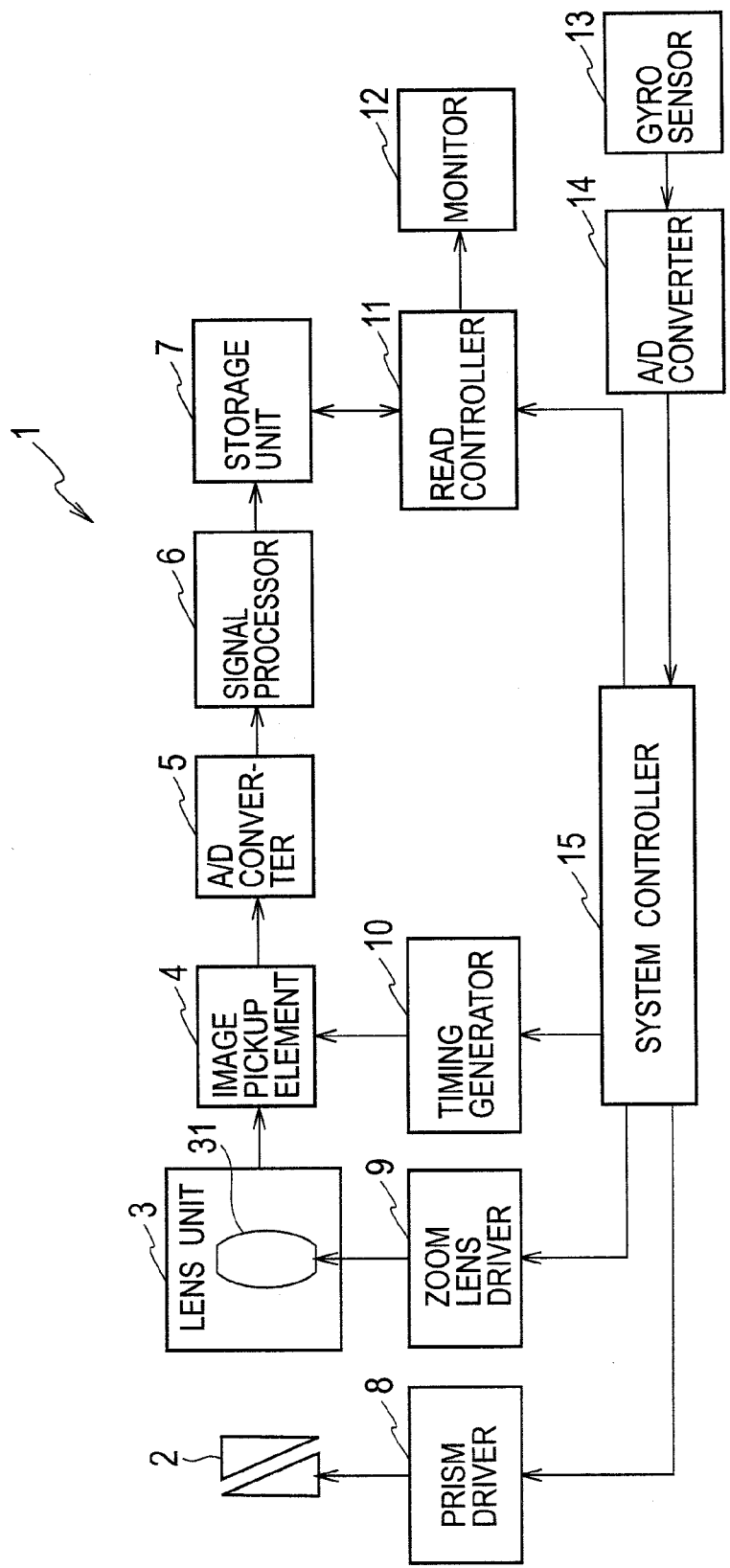
FIG. 1 is a block diagram showing a configuration of an image pickup apparatus according to a first embodiment of the present invention.

FIG. 1 is a block diagram showing a configuration of an image pickup apparatus according to a first embodiment of the present invention. As shown in FIG. 1, an image pickup apparatus 1 according to the first embodiment includes a prism 2, a lens unit 3, an image pickup element 4, an A/D converter 5, a signal processor 6, a storage unit 7, a prism driver 8, a zoom lens driver 9, a timing generator 10, a read controller 11, a monitor 12, a gyro sensor 13, an A/D converter 14, and a system controller 15.

The prism 2 is provided on the incidence side of light relative to the lens unit 3 and changes an optical axis angle of incident light from a subject to cause the light to enter the lens unit 3.

The lens unit 3 has a focusing lens group (not shown schematically) for performing focusing a zoom lens group 31 for optical zoom, etc., and forms an image of the incident light entering via the prism 2 on the image pickup element 4.

The image pickup element 4 includes a CCD and CMOS, and photoelectrically converts light entering through the lens unit 3 to output an electric signal. The A/D converter 5 converts an analog electric signal input from the image pickup element 4 into a digital signal.

The signal processor 6 processes the digital signal input from the A/D converter 5 to generate a photographed image including a luminance signal Y and color difference signals Cb and Cr and stores the image in the storage unit 7 including a DRAM (Dynamic Random Access Memory) etc.

The prism driver 8 drives the prism 2 and causes the prism 2 to perform an operation to change the optical axis angle of incident light for collecting a hand shake. The prism driver 8 and the prism 2 constitute an optical shake collector.

The zoom lens driver 9 drives the zoom lens group 31 of the lens unit 3 and causes the zoom lens group 31 to perform an optical zoom operation to change the magnification of a photographed image. The zoom lens driver 9 and the zoom lens group 31 constitute an optical zoom unit.

The timing generator 10 drives the image pickup element 4 by supplying various kinds of timing signals to the image pickup element 4.

The read controller 11 cuts out the photographed image stored in the storage unit 7 in a position specified by the system controller 15 and outputs the cut-out image to the monitor 12. The read controller 11 outputs the cut-out image also to the storage unit including a hard disk and optical disk which are not shown schematically, and the storage unit including a hard disk and optical disk, stores a video including input images.

Figure 2:
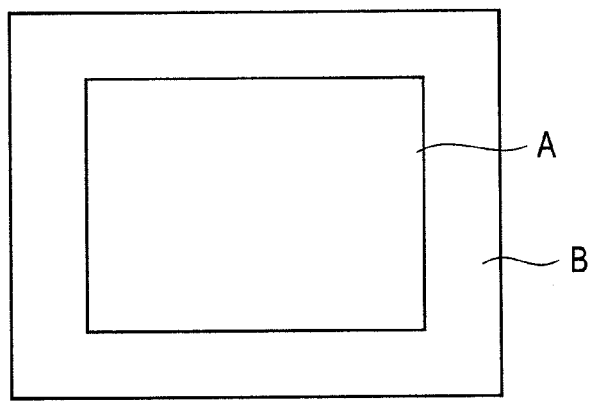
FIG. 2 is a diagram showing an image pickup region in the image pickup apparatus shown in FIG. 1.

Here, as shown in FIG. 2, the photographed image stored in the storage unit 7 has a region B for electronic shake correction around a region "A", which is a standard image pickup region. Due to the presence of such a region "B", it is possible to correct a shake of the photographed image by adjusting the cut-out position of the photographed image stored in the storage unit 7. The read controller 11 has the function as the electronic shake connector configured to adjust the position where the region "A", which is the standard image pickup region, is cut out from the photographed image in accordance with the shake angle of the image pickup apparatus 1. The raid controller 11 cuts out the region "A" in accordance with the shake angle of the image pickup apparatus 1 and outputs the cut-out image.

The monitor 12 includes a liquid crystal display and displays an image input from the read controller 11.

The gyro sensor (shake detector) 13 detects an angular velocity of the image pickup apparatus 1 that is generated by the hand shake and outputs a detection signal. The A/D converter 14 converts an analog detection signal input from the gyro sensor 13 into a digital signal and outputs the digital signal to the system controller 15.

The system controller (controller) 15 includes a microcomputer and controls each unit provided in the image pickup apparatus 1.

As the control contents relating to hand-shake correction, the system controller 15 calculates a shake angle (change in angle per predetermined time) of the image pickup apparatus 1 by integrating the angular velocity detected by the gyro sensor 13, distributes the shake angle to the optical shake correction and the electronic shake correction, and controls the prism driver 8 and the raid controller 11 to correct the shake of the photographed image by the respective systems.

Further, the system controller 15 has the function as a setting unit configured to set an optical correction ratio R_ratio, which is a distribution ratio of the shake angle to the optical shake correction, and to set a distribution ratio of the shake angle to the electronic shake correction as the rest of the ratio, that is, 1−R_ratio=(D_ratio). It may be also possible to find a travel distance from the shake angle and to perform such distribution based on the travel distance.

Next, the operation of the image pickup apparatus 1 will be described below.

At the time of photographing, the image pickup element 4 converts light entering through the prism 2 and the lens unit 3 into an electric signal to output the electric signal. The shutter speed (exposure time) of an electronic shutter in the image pickup element 4 is controlled by the system controller 15 via the timing generator 10.

The A/D converter 5 converts the analog electric signal input from the image pickup element 4 into a digital signal to output the digital signal and the signal processor 6 processes the digital signal input from the A/D converter 5 to generate a photographed image and stores the image in the storage unit 7.

During the period of photographing, the gyro sensor 13 detects an angular velocity of the image pickup apparatus 1 that is generated by the hand shake. The detection signal of the gyro sensor 13 is converted into a digital signal by the A/D converter 14 and then supplied to the system controller 15. The system controller 15 calculates a shake angle θ of the image pickup apparatus 1 by integrating the angular velocity detected by the gyro sensor 13.

Then, the system controller 15 sets the optical correction ratio R_ratio and controls the prism driver 8 to correct the shake angle θ of the image pickup apparatus 1 multiplied by R_ratio by the optical shake correction and at the same time, controls the read controller 11 to correct the shake angle θ multiplied by D_ratio (=1−R_ratio) by the electronic shake correction.

Then, the system controller 15 controls the monitor 12 to display the image read from the storage unit 7 by the read controller 11.

Figure 3:
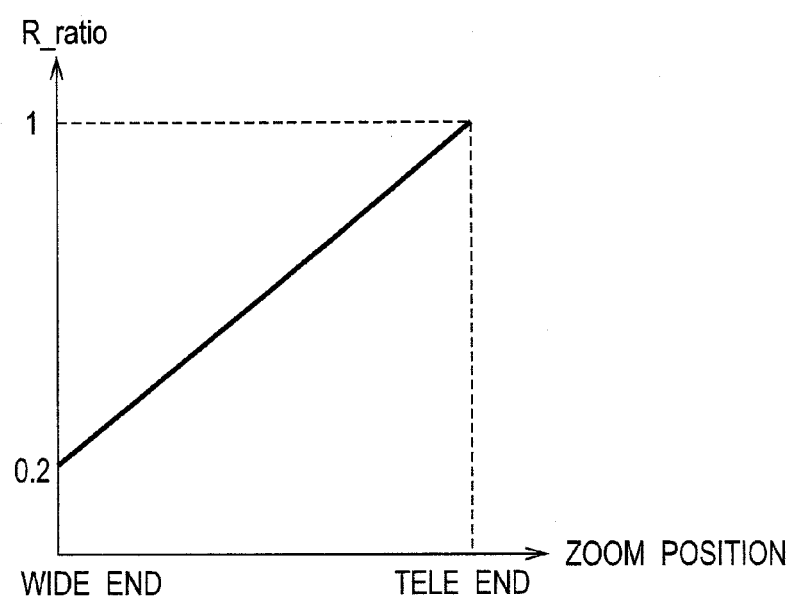
FIG. 3 is a diagram showing a relationship between an optical correction ratio and a zoom position of optical zoom in the first embodiment.

The optical correction ratio R_ratio is set in accordance with an optical zoom magnification and as shown in FIG. 3, the nearer the zoom position moves from the WIDE end toward the TELE end, that is, the higher the optical zoom magnification, the higher R_ratio is set.

In addition, at the TELE end (the optical zoom magnification is at its maximum), R_ratio=1 is set so that correction is made by using only the optical shake correction.

On the other hand, at the WIDE end (the optical zoom magnification is at its minimum), R_ratio is set so that the ratio between R_ratio and D_ratio is equal to the ratio between the size of the range that can be corrected by the optical shake correction and the size of the range that can be corrected by the electronic shake correction. The example of FIG. 3 shows a case where the ratio of size of correctable range between the optical shake correction and the electronic shake correction is 1:4 and R_ratio at the WIDE end is 0.2 and D_ratio is 0.8.

The reason R_ratio is set as described above is explained.

As the optical zoom magnification becomes higher, the focal length of the zoom lens group 31 increases. Because of this, the shake width of an image becomes larger compared to the case where the optical zoom magnification is small even if the shake angle of the image pickup apparatus 1 is the same.

As described above, by the electronic shake correction, it is not possible to correct an image shake within an exposure time of the image pickup element 4, and therefore the image quality tends to degrade compared to the optical shake connection. When the optical zoom magnification is high, the shake width of an image becomes large as described above, and therefore the degradation in image quality becomes more conspicuous. Consequently, the higher the optical zoom magnification, the higher R_ratio is set and at the TELE end at which the optical zoom magnification reaches its maximum, R_ratio=1 is set and only the optical shake correction is used to suppress degradation in image quality.

Figure 4:
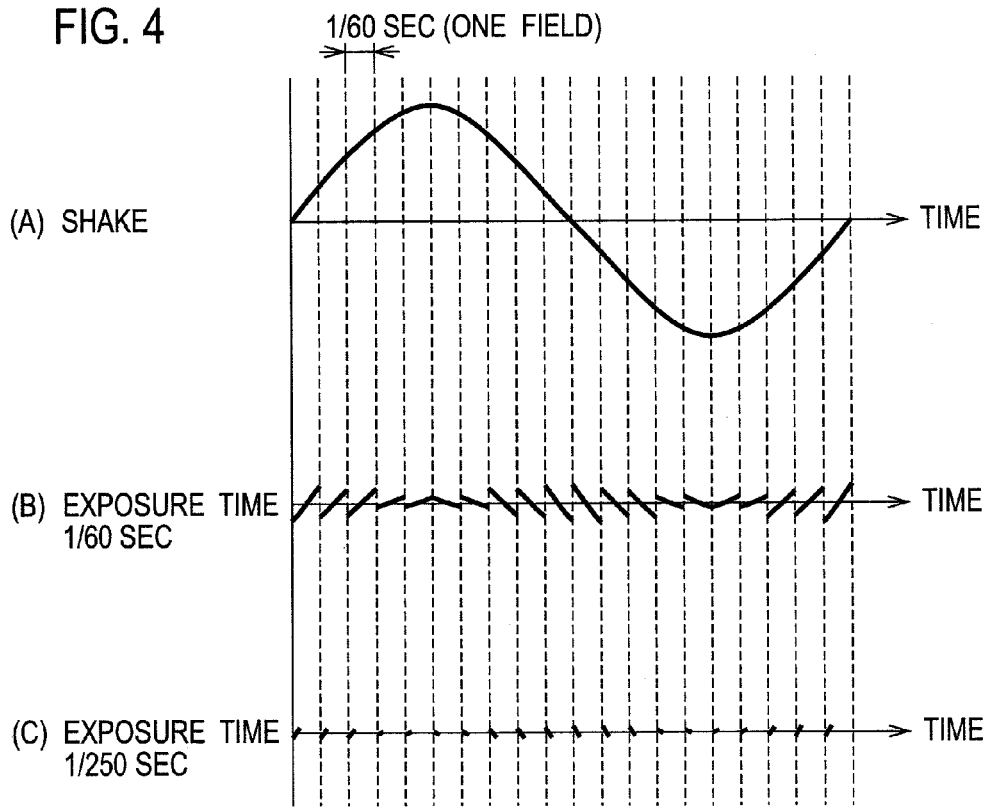
FIGS. 4(A) to 4(C) are diagrams for explaining a shake width in each field when an electronic shake correction is made.

Here, the reason why the image quality of the optical shake correction is lower compared to the electronic shake correction is explained. It is assumed that a hand shake in the shape of a wave as shown in FIG. 4(A) occurs at the time of normal shuttering when the field interval is 1/60 seconds and the exposure time of the image pickup element 4 is 1/60 seconds. FIG. 4(B) is a diagram showing the magnitude of the shake width in each field when the electronic shake correction is made in this case.

In the electronic shake correction, the image shake is corrected by controlling the cut-out position of the photographed image, and therefore the shake between the fields can be corrected as shown in FIG. 4(B). However, the field is formed in units of 1/60 seconds, and therefore it is not possible to connect the shake within the field (within the exposure time). Because of this, in some fields, the shake width within the mage is large and the image quality is degraded.

Explanation is returned to that of R_ratio. When the optical zoom magnification is low, the degree of degradation in image quality by the electronic shake correction is small compared to that when the magnification is high, and therefore R_ratio is reduced and the distribution ratio D_ratio to the electronic shake correction is increased, and thereby the range that can be corrected by the image pickup apparatus 1 is extended.

As described above, both the optical shake correction and the electronic shake correction have a finite correctable range. For the optical shake correction, the correctable range is determined by the movable range of the prism 2 etc. and for the electronic shake correction, the correctable range is determined by the size of the region B for the electronic shake correction shown in FIG. 2 etc.

It is possible to make use of the correctable ranges of the two systems most effectively when the ratio between the size of the correctable range by the optical shake correction and the size of the correctable range by the electronic shake correction and the ratio between R_ratio and D_ratio are equal.

This is explained. For example, it is assumed that the correctable range by the optical shake correction is Rmax=±1°, the correctable range by the electronic shake correction is Dmax=±4°, and the detected shake angle of the image pickup apparatus 1 is θ=5°.

In this case, if it is assumed that R_ratio=0.2 and D_ratio=0.8, the angle to be distributed to the optical shake correction is θr=5°×0.2=1° and the angle to be distributed to the electronic shake correction is θd=5°×0.8=4°. Consequently, θd=Rmax and θd=Dmax, and therefore both θr and θd can be corrected. As a result in this case, the total angle that can be corrected by the two systems is θr+θd=1°+4°=5°, and therefore the shake angle θ=5° can be corrected.

In contrast to this, for example, when R_ratio=0.3 and D_ratio=0.7, θr=5°×0.3=1.5° and θd=5°×0.7=3.5°. Consequently, θd<Dmax, and therefore the angle θd=3.5° that is distributed can be corrected by the electronic shake correction. On the other hand, however, θr>Rmax, and therefore the angle θr=1.5° that is distributed cannot be corrected by the optical shake correction. Consequently in this case, the total angle that can be corrected by the two systems is Rmax+θd=1°+3.5°=4.5°, which is smaller than the shake angle θ=5°.

Further, for example, when R_ratio=0.1 and D_ratio=0.9, θr=5°×0.1=0.5° and θd=5°×0.9=4.5°. Consequently θr<Rmax, and therefore the angle θr=0.5° that is distributed can be corrected by the optical shake correction. On the other hand, however, θd>Dmax, and therefore the angle θd=4.5° that is distributed cannot be corrected by the electronic shake correction. Consequently, in this case, the total angle that can be corrected by the two systems is θr+Dmax=0.5°+4°=4.5°, which is smaller than the shake angle θ=5°.

As described above, when the ratio between R_ratio and D_ratio and the ratio between Rmax and Dmax are not equal, there may occur a state where an angle exceeding the correctable range is distributed to one of the optical shake correction and the electronic shake correction, but, the correctable range is not used to its full extent by the other shake correction. In this case, it is possible to correct only an angle smaller than the total of the correctable ranges of the two systems.

In contrast to this, when the ratio between R_ratio and D_ratio and the ratio between Rmax and Dmax are equal, when one of the optical shake correction and the electronic shake correction uses the correctable range to its full extent, the other shake correction is also in the state where the correctable range is used to its full extent. Because of this, it is possible to make use of the correctable ranges of the two systems most effectively.

Therefore, when the zoom position is at the WIDE end, it is aimed to extend the correction range of image shake in the image pickup apparatus 1 by setting R_ratio so that the ratio between R_ratio and D_ratio and the ratio between Rmax and Dmax are equal to make the maximum use of the correctable ranges of both the systems.

As explained above, according to the first embodiment, it is possible to extend the correctable range of image shake while suppressing an increase in size of the apparatus configuration and degradation in image quality by making the image shake correction by the two systems of optical shake correction and electronic shake correction and by setting R_ratio higher as the optical zoom magnification becomes higher.

Note that the relationship between R_ratio and the zoom position may be any relationship as long as R_ratio becomes higher as the optical zoom magnification becomes higher and does not need to be linear as shown in FIG. 3.

Further, when the detected shake angle θ is larger than the total angle that can be corrected by the two systems by distributing the shake angle θ to the optical shake connector and the electronic shake corrector based on R_ratio and there is a margin in the correctable range for the distributed angle in one of the two systems, it may also be possible to change R_ratio to increase the total angle that can be corrected by the two systems.

For example, it is assumed that a shake angle θ=5° is detected when the correctable range by the optical shake correction is Rmax=±1° and the correctable range by the electronic shake correction is Dmax=+4° and R_ratio=0.3 and D_ratio=0.7 are set. In this case, the total angle that can be corrected by the two systems is found as Rmax+θd=4.5° by the same calculation as that in the example previously described, which is smaller than the shake angle θ=5°.

The angle that is distributed to the optical shake correction is θr=1.5°, which is larger than Rmax=1°, and therefore no more correction can be made by the optical shake correction. On the other hand, the angle that is distributed to the electronic shake correction is θd=3.5°, which is smaller than Dmax=4°, and therefore there is a margin in the correctable range by the electronic shake correction.

In this case, if R_ratio is changed to 0.2 and D_ratio to 0.8, the total angle that can be corrected by the two systems is θr+θd=1°+4°=5° by the same calculation as that in the example described previously, and therefore the total angle becomes larger than when R_ratio=0.3 and D_ratio=0.7.

By changing R_ratio as described above, it is possible to extend the total correctable range by the two systems.

Further, when the are margins in the correctable ranges by both the optical shake correction and the electronic shake correction for the angles to be distributed based on set R_ratio, it may also be possible to change R_ratio so that a larger angle is distributed to the optical shake correction. If this is done, it is possible to suppress degradation in image quality while maintaining the total correctable range by the two systems.

Here, both the optical shake correction and the electronic shake correction are systems that operate independently in the horizontal direction and in the vertical direction and the shake angle θ is also detected by the gyro sensor 13 in the horizontal direction and in the vertical direction, respectively R_ratio in accordance with the optical zoom magnification is set to a value common in the horizontal direction and in the vertical direction, but, when R_ratio is changed as described above, R_ratio is changed separately in the horizontal direction and in the vertical direction. The directions are not limited to the horizontal direction and the vertical direction and any directions may be used as long as they are substantially orthogonal to each other.

Note that it may also be possible to set R_ratio in accordance with the optical zoom magnification separately in the horizontal direction and in the vertical direction. For example, at the WIDE end, a shake in the vertical direction occurs frequently because a user photographs while walking and at the TELE end, a shake in the vertical direction occurs less frequently, but, a shake in the horizontal direction may occur when a user photographs while moving the image pickup apparatus in the horizontal direction. By setting R_ratio separately in the horizontal direction and in the vertical direction, it is possible to deal with such differences in tendency of the shake direction due to the optical zoom magnification.

Second Embodiment

An image pickup apparatus according to a second embodiment has the same configuration as that of the image pickup apparatus 1 of the first embodiment, and therefore explanation is given using FIG. 1.

In the second embodiment, the system controller 15 sets the optical correction ratio R_ratio in accordance with the shutter speed (exposure time) of the electronic shutter in the image pickup element 4.

Figure 5:
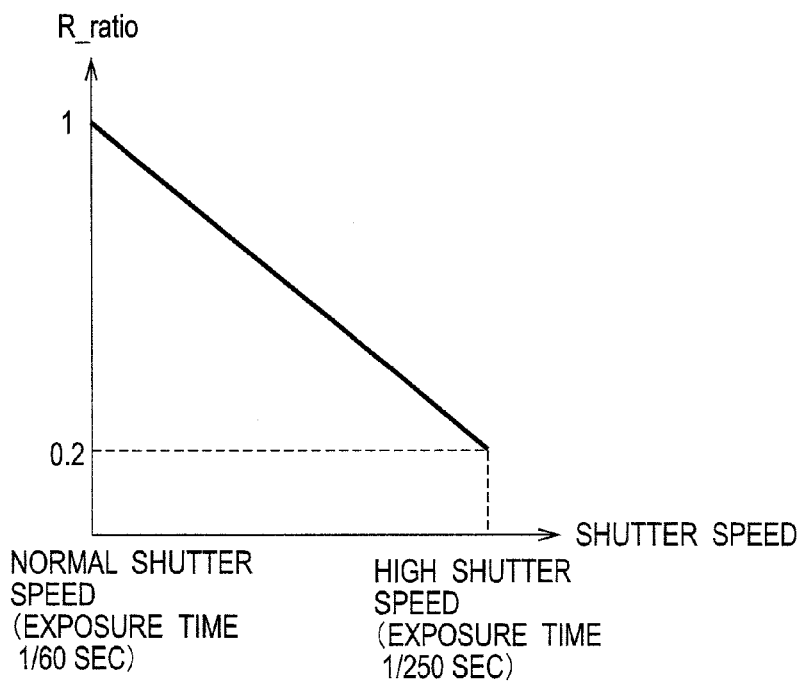
FIG. 5 is a diagram showing a relationship between an optical correction ratio and the shutter speed of an image pickup element in a second embodiment.

FIG. 5 is a diagram showing a relationship between the shutter speed and R_ratio in the second embodiment. As shown in FIG. 5, the higher the shutter speed (the shorter the exposure time), the lower R_ratio is set.

In addition, at the normal shutter speed (exposure time of 1/60 seconds), R_ratio=1 is set, that is, the correction is made by using only the optical shake correction.

On the other hand, at the highest shutter speed (for example, exposure time of 1/250 seconds), R_ratio is set so that the ratio between R_ratio and D_ratio and the ratio between Rmax and Dmax are equal. The example of FIG. 5 shows a case of Rmax:Dmax=1:4 and R_ratio=0.2 and D_ratio=0.8 at the highest shutter speed.

As explained using FIGS. 4(A) and 4(B), at the normal shutter speed with the exposure time of 1/60 seconds, image quality is degraded by the electronic shake correction. In contrast to this, when the shutter speed is higher than the normal shutter speed, for example, at the highest shutter speed with the exposure time of 1/250 seconds, the exposure time per field is short as shown in FIG. 4(C), and therefore the shake width within the field is small and the image quality does tend to degrade compared to that at the time of the normal shutter speed.

Because of the above, the slower the shutter speed, the higher R_ratio is set and at the normal shutter speed with the exposure time of 1/60 seconds, R_ratio=1 is set, and thereby only the optical shake correction is used to suppress degradation in image quality.

On the other hand, at the highest shutter speed when the exposure time is shortest, it is aimed to extend the correction range of image shake in the image pickup apparatus 1 by setting R_ratio so that the ratio between R_ratio and D_ratio and the ratio between Rmax and Dmax are equal and by making the maximum use of the correctable ranges of both the systems as in the case of the WIDE end in the example of FIG. 3 explained in the first embodiment.

The shutter speed of the image pickup element 4 is set by the system controller 15 based on the luminance of the photographed image generated in the signal processor 6. The longer the exposure time, the higher the luminance of the photographed image becomes, and therefore, for example, when the luminance is too high, the luminance is adjusted by shortening the exposure time.

The system controller 15 supplies a timing control signal to the timing generator 10 so as to drive the image pickup element 4 at a set shutter speed. Further, the system controller 15 sets R_ratio in accordance with the shutter speed and controls the prism driver 8 to correct the shake angle θ of the image pickup apparatus 1 multiplied by R_ratio by the optical shake connection and at the same time, controls the read controller 11 to correct the shake angle θ multiplied by D_ratio by the electronic shake correction.

According to the second embodiment, by setting R_ratio lower as the shutter speed becomes higher, it is possible to extend the correctable range of image shake while suppressing an increase in size of the apparatus configuration and degradation in image quality.

Note that the relationship between R_ratio and the shutter speed may be any relationship as long as the higher the shutter speed, the lower R_ratio becomes and does not need to be linear as that in FIG. 5.

In addition, as in the first embodiment, in the second embodiment also, when the detected shake angle θ is larger than the total angle that can be corrected by the two systems by distributing the shake angle θ to the optical shake corrector and the electronic shake corrector based on R_ratio and there is a margin in the correctable range for the distributed angle in one of the two systems, it may also be possible to change R_ratio so that the total angle that can be corrected by the two systems becomes larger.

Further, as in the first embodiment, when there are margins in the correctable ranges by both the optical shake correction and the electronic shake correction for the angles to be distributed based on set R_ratio, it may be also possible to change R_ratio so that a larger angle is distributed to the optical shake correction.

Here, R_ratio in accordance with the shutter speed is set to a value common in the horizontal direction and in the vertical direction, but, as in the first embodiment, when R_ratio is changed as described above, R_ratio is changed separately in the horizontal direction and in the vertical direction.

In addition, it may also be possible to set R_ratio by using both R_ratio1 (first ratio) set as in FIG. 3 shown in the first embodiment and R_ratio2 (second ratio) set as in FIG. 5 shown in the second embodiment.

For example, it may also be possible to set a value of the product of R_ratio1 and R_ratio2 described above as R_ratio. If this is done, it is possible to change R_ratio more appropriately in accordance with both the zoom position and the shutter speed.

Further, it may also be possible to separately use, for example, R_ratio1 at the WIDE end at the shutter speeds in the range with the exposure time of $1/60$ to $1/100$ seconds and use a value of the product of R_ratio1 and R_ratio2 as R_ratio at the other shutter speeds.

Furthermore, it may also be possible to set R_ratio in accordance with the shutter speed separately in the horizontal direction and in the vertical direction.

INDUSTRIAL APPLICABILITY

As described above, the present invention provides an image pickup apparatus and an image shake collection method capable of extending the collectable range of image shake while suppressing degradation in image quality.

REFERENCE SIGNS LIST

1 . . . image pickup apparatus
2 . . . prism
3 . . . lens unit
4 . . . image pickup element
5 . . . A/D converter
6 . . . signal processor
7 . . . storage unit
8 . . . prism driver
9 . . . zoom lens driver
10 . . . timing generator
11 . . . read controller
12 . . . monitor
13 . . . gyro sensor
14 . . . A/D converter
15 . . . system controller

The invention claimed is:

1. An image pickup apparatus comprising:
   an image pickup element configured to generate an electric signal by photoelectrically converting incident light that enters the image pickup apparatus from a subject;
   a signal processor configured to generate a photographed image based on the electric signal;
   a shake detector configured to detect a shake angle of the image pickup apparatus;
   an optical shake corrector configured to optically correct a shake of the photographed image;
   an electronic shake corrector configured to correct the shake by cutting out a predetermined region of the photographed image;
   a setting unit configured to set a ratio in which the shake angle is distributed to the optical shake corrector and the electronic shake corrector, respectively, so that the shorter an exposure time of the image pickup element when photoelectrically converting the incident light, the lower a ratio is in which the shake angle is distributed to the optical shake corrector; and
   a controller configured to distribute the shake angle based on the set ratio and to control the optical shake corrector and the electronic shake corrector to correct the shake of the photographed image based on the distributed shake angles, wherein
   when the exposure time is set to the shortest exposure time in the image pickup apparatus, the setting unit sets a ratio in which the shake angle is distributed so that a ratio between a shake angle to be distributed to the optical shake corrector and a shake angle to be distributed to the electronic shake corrector and a ratio between the size of correctable range of the optical shake corrector and the size of correctable range of the electronic shake corrector are equal.

2. The image pickup apparatus according to claim 1, wherein
   when the shake angle detected by the shake detector is larger than a total angle that can be corrected by the optical shake corrector and the electronic shake corrector and there is a margin in the correctable range for the angle distributed based on the ratio in one of the optical shake corrector and the electronic shake corrector, the setting unit changes the ratio so that the total angle becomes larger.

3. The image pickup apparatus according to claim 1, wherein
   the setting unit sets the ratio separately in a predetermined direction and a direction substantially orthogonal to the predetermined direction.

* * * * *